United States Patent [19]

Sangregory et al.

[11] Patent Number: 5,802,401
[45] Date of Patent: Sep. 1, 1998

[54] METHOD OF REMANUFACTURING ONE-TIME-USE CAMERA

[75] Inventors: Jude A. Sangregory, Spencerport; Edgar G. Earnhart, Hilton; Joseph C. Weiser, Rochester, all of N.Y.

[73] Assignee: Eastman Kodak Company, Rochester, N.Y.

[21] Appl. No.: 861,585

[22] Filed: May 22, 1997

[51] Int. Cl.$^6$ .................... G03B 17/02; G03B 17/26
[52] U.S. Cl. .................... 396/6; 396/512; 396/535; 396/538; 242/348
[58] Field of Search .................... 396/6, 511, 512, 396/535, 538; 242/348

[56] References Cited

U.S. PATENT DOCUMENTS

| | | | |
|---|---|---|---|
| 1,263,228 | 4/1918 | Goddard et al. | 396/536 |
| 3,490,348 | 1/1970 | Ariyasu et al. | 396/512 |
| 4,077,041 | 2/1978 | Imura | 396/535 X |
| 4,650,304 | 3/1987 | Harvey | 396/60 |
| 4,928,900 | 5/1990 | Beery | 242/348.4 |
| 5,187,514 | 2/1993 | Ikenoue | 396/512 |
| 5,280,237 | 1/1994 | Stoneham et al. | 324/765 |
| 5,349,410 | 9/1994 | Kamata | 396/6 |
| 5,649,236 | 7/1997 | Balling | 396/6 |

Primary Examiner—Eddie C. Lee
Assistant Examiner—J. K. Han
Attorney, Agent, or Firm—Roger A. Fields

[57] ABSTRACT

A method of remanufacturing a one-time-use camera having the following steps. Cutting a protuberance off a main body part of the camera at a hollowed-out space in the protuberance in order to permit a standard cartridge to replace a modified cartridge within a chamber in the main body part. Closing a hole in the chamber, resulting from the protuberance being cut off the main body part at the hollowed-out space, to prevent ambient light from leaking into the chamber through the hole. And properly positioning the standard cartridge in the chamber.

12 Claims, 6 Drawing Sheets

METHOD OF REMANUFACTURING ONE-TIME-USE CAMERA

CROSS-REFERENCE TO RELATED APPLICATIONS

Reference is made to commonly assigned copending applications Ser. No. 08/862,205, entitled ONE-TIME-USE CAMERA CAN ONLY BE USED WITH MODIFIED FILM CARTRIDGE, TO PREVENT UNAUTHORIZED REUSE WITH STANDARD FILM CARTRIDGE and filed May 22, 1997 in the names of Jude A. SanGregory, Edgar G. Earnhart and Joseph C. Weiser, Ser. No. 08/861,876, entitled FRANGIBLE PORTION OF ONE-TIME-USE CAMERA MUST BE BROKEN TO OPEN CAMERA, WHICH LEAVES HOLE TO DISCOURAGE UNAUTHORIZED RECYCLING, and filed May 22, 1997, and Ser. No. 08/862, 119, entitled METHOD OF REMANUFACTURING ONE-TIME-USE CAMERA and filed May 22, 1997 in the name of Bernd Wagner.

FIELD OF THE INVENTION

The invention relates generally to the field of photography, and in particular to one-time-use cameras. More specifically, the invention relates to a method of remanufacturing a one-time-use camera that is intended only to be used with a modified or special film cartridge to prevent unauthorized reuse of the camera with a standard film cartridge.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional 35 mm film cartridge in a cartridge receiving chamber, a film take-up spool in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each time a picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting, and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from a fresh cartridge is attached to the film take-up spool, the fresh cartridge and the film take-up spool are loaded into the cartridge receiving and film supply chambers, and an intermediate leader section which bridges the film take-up spool and the fresh cartridge is engaged with the metering sprocket. The front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the fresh cartridge onto the film take-up spool and to rotate the metering sprocket to increment the frame counter to its total-available frame number setting. Lastly, the outer box or label is placed on the camera unit.

PRIOR ART PROBLEM

There is a need recognized in the industry to prevent unauthorized recycling (remanufacturing) of one-time-use cameras in order to maintain camera quality. Unauthorized recycled cameras may be of lesser quality than authorized recycled cameras because the reused parts may be worn or damaged. This problem is further described in U.S. Pat. No. 5,452,033 issued Sep. 19, 1995 and No. 5,235,366 issued Aug. 10, 1993.

One example of a possible solution to the problem is disclosed in prior art U.S. Pat. No. 5,349,410 issued Sep. 20, 1994. This patent suggests as a way to prevent unauthorized recycling that an anti-backup pawl for the thumbwheel be broken when the rear cover part is separated from the main body part to obtain the film cartridge from the cartridge receiving chamber. The rear cover part has a projecting hook that extends through a hole in the anti-backup pawl to engage the pawl. The anti-backup pawl is connected to the main body part at a location which includes a weakened notch section. Thus, separating the rear cover part from the main body part breaks the anti-backup pawl away from the main body part at the weakened notch section.

Another example of a possible solution to the problem is for the rear cover part to have an integral door portion that is to be opened to remove the film cartridge from the cartridge receiving chamber and to have a grooved line of weakness between the door portion and a remaining portion of the rear cover part. The grooved line of weakness forms a living hinge between the door portion and the remaining portion of the rear cover part which tends to fracture when the door portion is opened. The fracture allows the door portion to be readily separated from the remaining portion of the rear cover part, to leave a large opening to the main body part which allows ambient light to enter the cartridge receiving chamber. The fracture, often however, may not be sufficient to readily separate the door portion from the remaining portion of the rear cover part. Consequently, the rear cover part might be reused, provided an opaque tape is adhered to the fractured line of weakness to prevent any possible light leak.

THE CROSS-REFERENCED APPLICATIONS

Cross-referenced application Ser. No. 08/861,876 discloses a further example of a possible solution to the problem. In this instance, a continuous line of weakness circumscribes a predetermined portion of either the main body part or one of the front or rear cover parts to permit the predetermined portion to be broken away from the main body part or cover part along the continuous line of weakness and leave a hole in the main body part or cover part in the place of the predetermined portion. The cover part is connected to the main body part at the predetermined portion to cause the predetermined portion to be broken away from the main body part or cover part when the main body part and the cover part are forcibly pulled apart.

Cross-referenced application Ser. No. 08/862,205 discloses another example of a possible solution to the problem. In this instance, the film cartridge is a modified cartridge as compared to a standard cartridge, because it has a recess that is not on the standard cartridge. The main body part has a blocking protuberance that projects into the cartridge receiving chamber to fit in the recess when the modified cartridge is placed in the chamber, but which will abut the standard cartridge to prevent it from being placed in the chamber when one attempts to substitute the standard cartridge for the modified cartridge. A hollowed-out space is provided in the blocking protuberance that will allow ambient light to leak into the cartridge receiving chamber should one cut the protuberance off the main body part at the hollowed-out space in order to permit the standard cartridge to be placed in the chamber.

Cross-referenced application Ser. No. 08/862,205 discloses a method of remanufacturing the one-time-use camera disclosed in cross-referenced application Ser. No. 08/862,205.

SUMMARY OF THE INVENTION

According to the invention, there is provided a method of remanufacturing the one-time-use camera disclosed in cross-referenced application Ser. No. 08/862,205.

As disclosed in cross-referenced application Ser. No. 08/862,205, the one-time-use camera includes a modified cartridge that has a recess which is not on a standard cartridge, and a main body part with a blocking protuberance that projects into a chamber in the main body part to fit in the recess when the modified cartridge is located in a predetermined position within the chamber, but which will abut the standard cartridge to prevent it from being located in the predetermined position within the chamber if one attempts to substitute the standard cartridge for the modified cartridge. The protuberance has a hollowed-out space that will allow ambient light to leak into the chamber should one cut the protuberance off the main body part at the hollowed-out space in order to permit the standard cartridge to be located in the predetermined position within the chamber.

The method of remanufacturing the one-time-use camera comprises the steps of:

cutting the protuberance off the main body part at the hollowed-out space in order to permit the standard cartridge to be located in the predetermined position within the chamber;

closing a hole in the chamber, resulting from the protuberance being cut off the main body part at the hollowed-out space, to prevent ambient light from leaking into the chamber through the hole; and locating the standard cartridge in the predetermined position within the chamber.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 4:
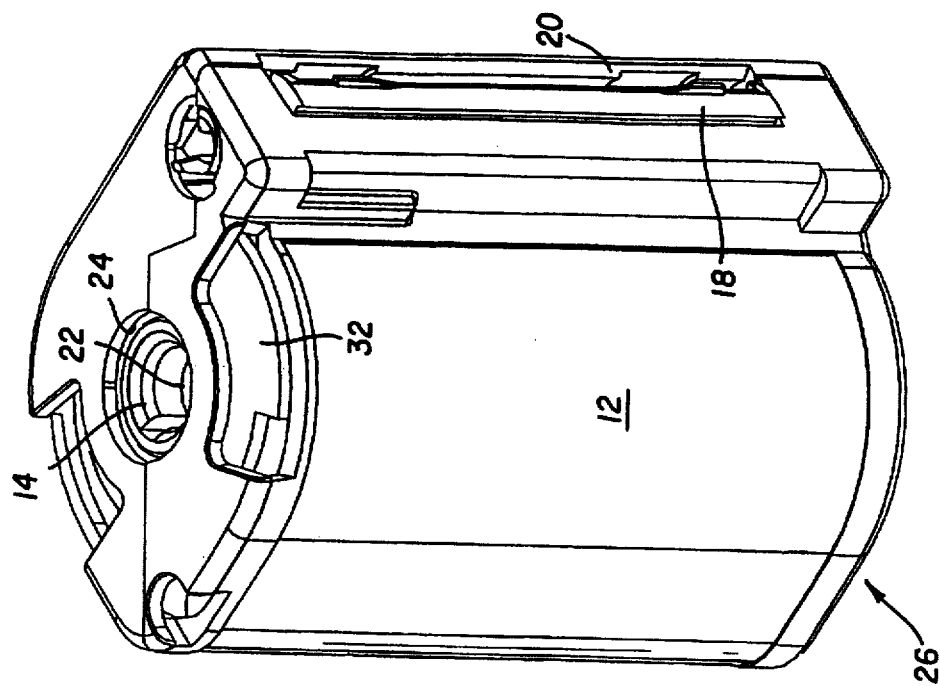
FIG. 4 is a top perspective view of a standard film cartridge not to be included in the one-time-use camera.
Figure 3:
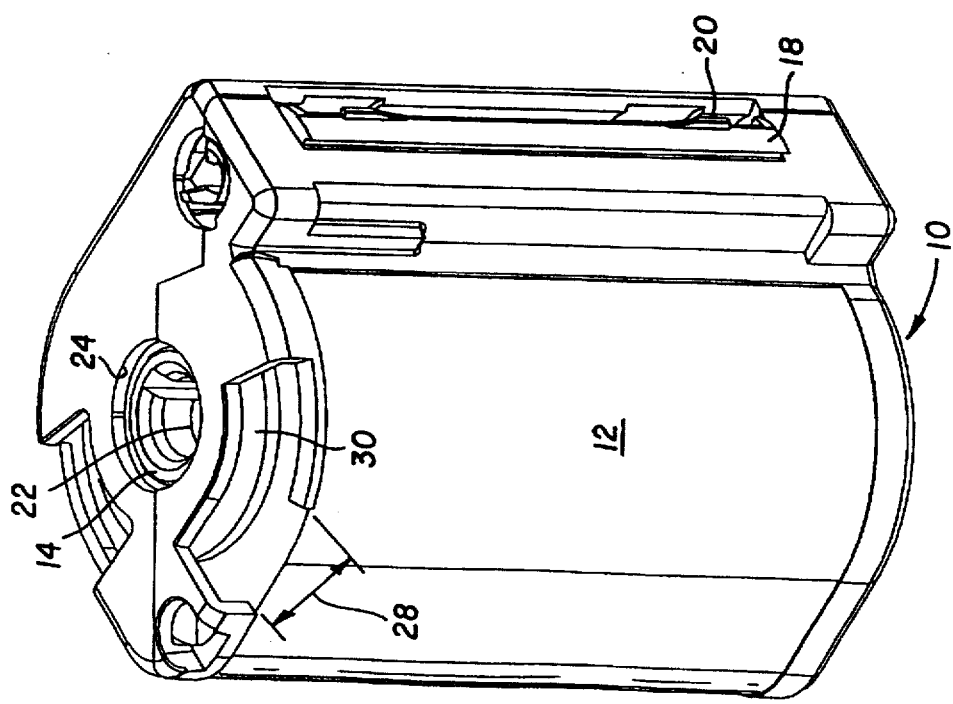
FIG. 3 is a top perspective view of a modified film cartridge included in the one-time-use camera.
Figure 5:
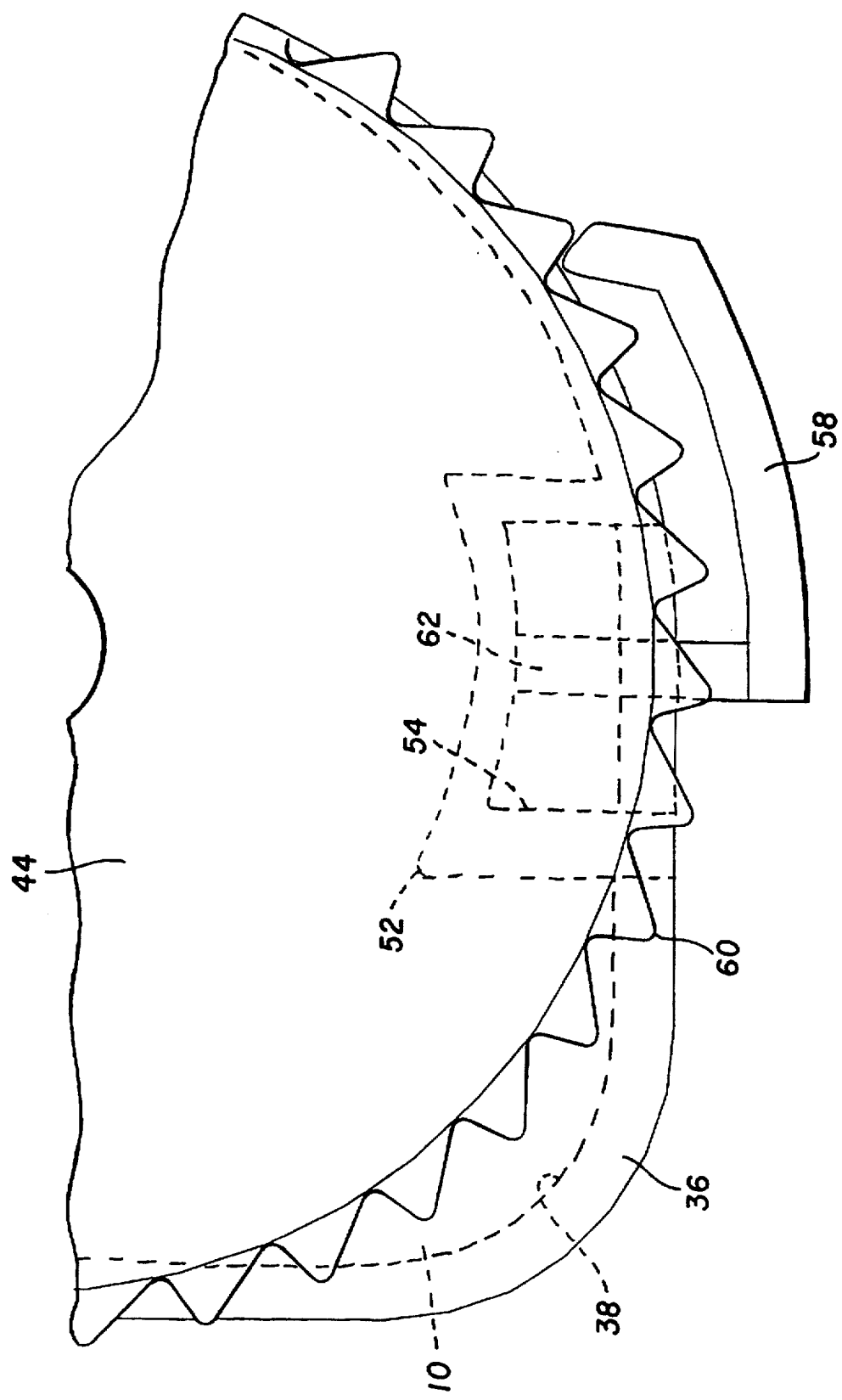
FIG. 5 is a top plan view of a limited portion of the one-time-use camera.

Referring now to the drawings, FIGS. 1, 2, 3 and 6 show a modified Advanced Photo System (APS) film cartridge 10, which is smaller than a conventional 35 mm film cartridge. The modified film cartridge 10 is similar in operation to ones disclosed in prior art U.S. Pat. No. 5,357,303 issued Oct. 18, 1994 and No. 5,231,438 issued Jul. 27, 1993. The modified film cartridge 10 includes a shell 12 that contains a film spool 14 on which is to be wound an exposed filmstrip 16. A light lock 18 is supported within a film slot 20 in the shell 12 to be pivoted open to permit film movement through the slot and into the shell, and to be pivoted closed to prevent ambient light from entering the shell through the slot. The film spool 14 has a coaxial drive cavity 22 accessible through a top circular opening 24 in the shell 12. All of these features of the modified film cartridge 10 are the same as a standard APS film cartridge 26 shown in FIGS. 4 and 7. The modified film cartridge 10 differs from the standard film cartridge 26 in that the shell 12 of the modified film cartridge has a top recess or cut-out 28 which is not in the shell 12 of the standard film cartridge. See FIGS. 3 and 4. Also, the film spool 14 of the modified film cartridge 10 has a data disk supporting flange 30 that is radially shortened as compared to a data disk supporting flange 32 of the film spool 30 of the standard film cartridge 26.

Figure 1:
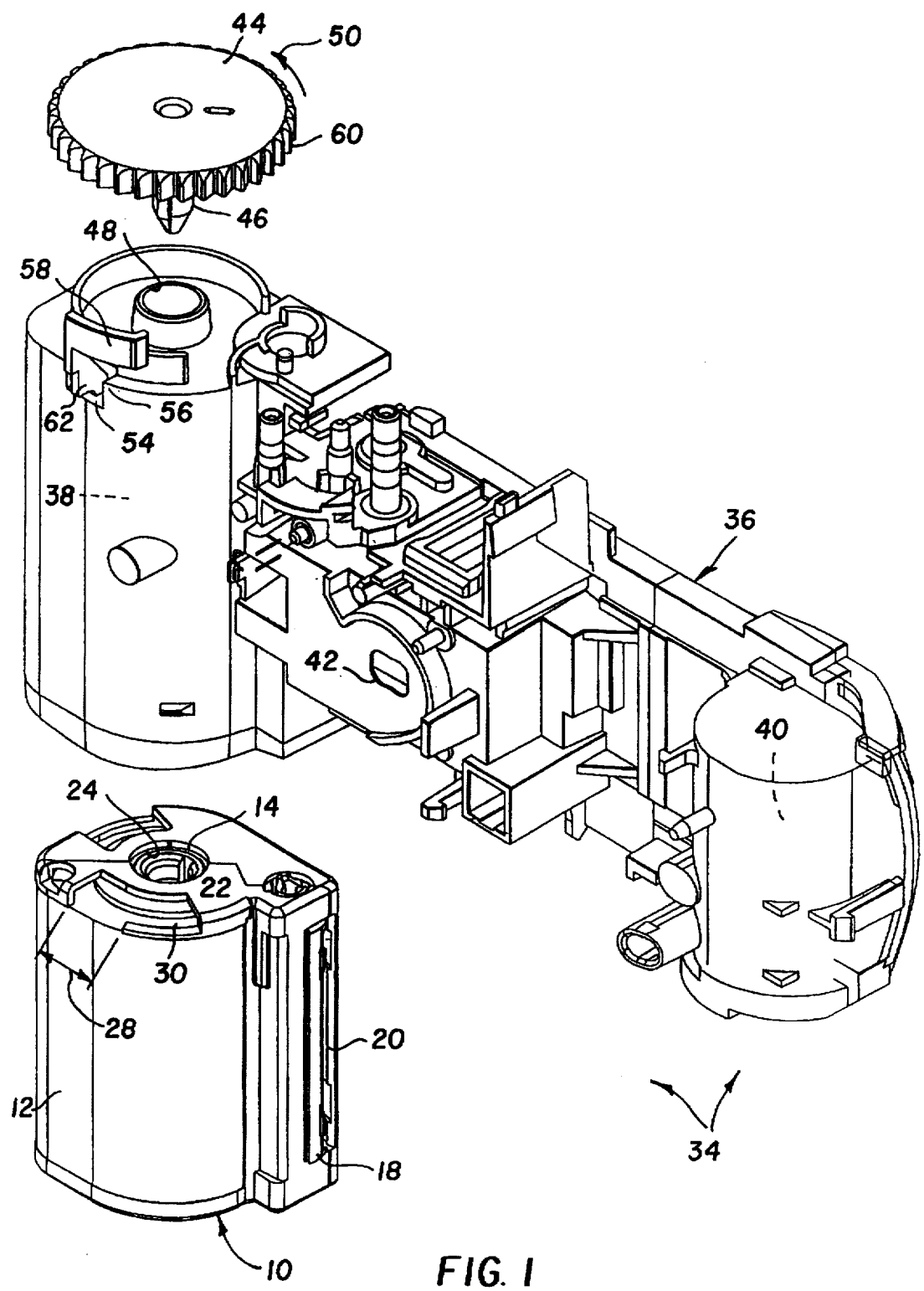
FIG. 1 is a front exploded perspective view of the one-time-use camera pursuant to a preferred embodiment of the invention.
Figure 2:
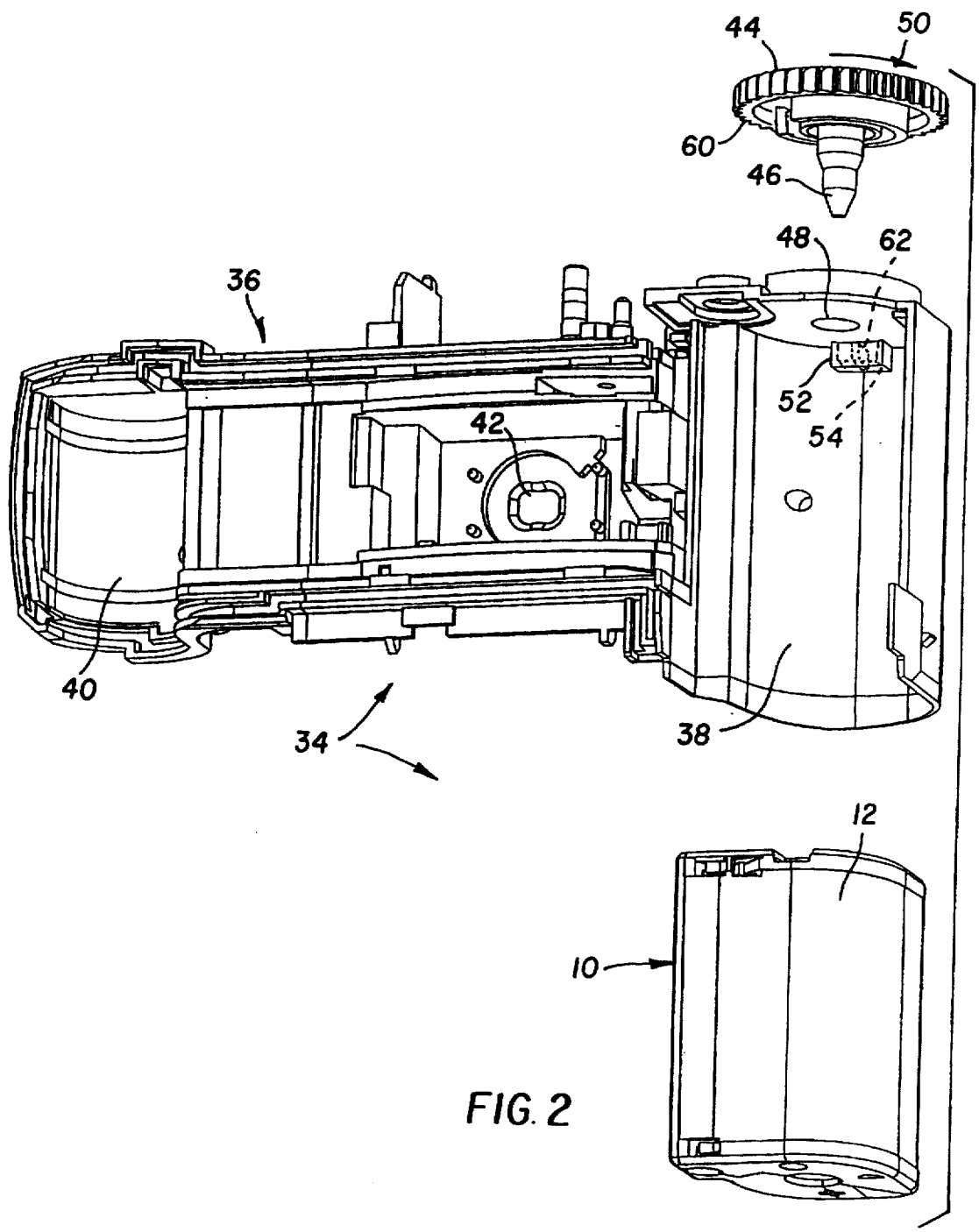
FIG. 2 is a rear exploded perspective view of the one-time-use camera.
Figure 6:
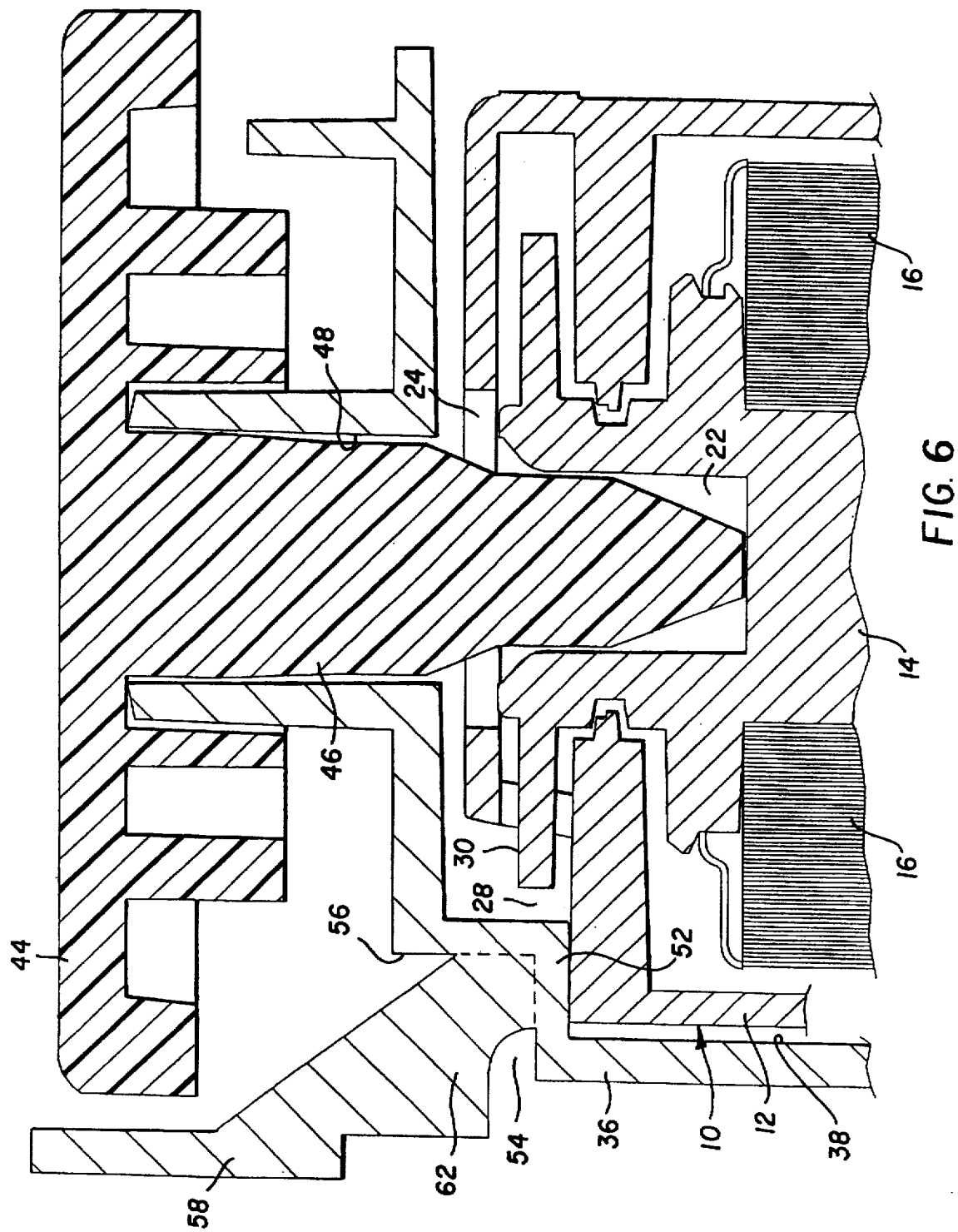
FIG. 6 is an elevation section view of the limited portion shown in FIG. 3, and including the modified film cartridge.

A partially shown one-time-use camera 34 which includes the modified film cartridge 10 (and is not intended to include the standard film cartridge 26) is depicted in FIGS. 1, 2, 5 and 6. A main body part 36 of the camera 34 has a cartridge receiving chamber 38 for the modified film cartridge 10, an unexposed film roll chamber 40 and an exposure aperture 42. As shown in FIGS. 2 and 6, the modified film cartridge 10 is located in the cartridge receiving chamber 38 in a predetermined position. A film winder wheel 44 has a depending coaxial stem 46 that extends through a top circular opening 48 in the main body part 36 and into the drive cavity 22 in the film spool 14 of the modified film cartridge 10 to coaxially engage the film spool. After each time a picture is taken with the camera 34, the photographer manually rotates the film winder wheel 44 in a film winding direction 50 to similarly rotate the film spool 14. This winds an exposed section of the filmstrip 16 into the shell 12 of the modified film cartridge 10.

A blocking protuberance 52 integrally formed with the main body part 36 projects into the cartridge receiving chamber 38 to fit in the top recess 28 in the shell 12 of the modified film cartridge 10 when the modified film cartridge is located in the predetermined position within the cartridge receiving chamber. See FIGS. 1, 2, 5 and 6. The blocking protuberance 52 will abut the shell 12 of the standard film cartridge 26 to prevent the standard film cartridge from being located in the predetermined position within the cartridge receiving chamber 38 if one attempts to substitute the standard film cartridge for the modified film cartridge 10. This is because the shell 12 of the standard film cartridge 26 does not have the top recess 28.

Figure 7:
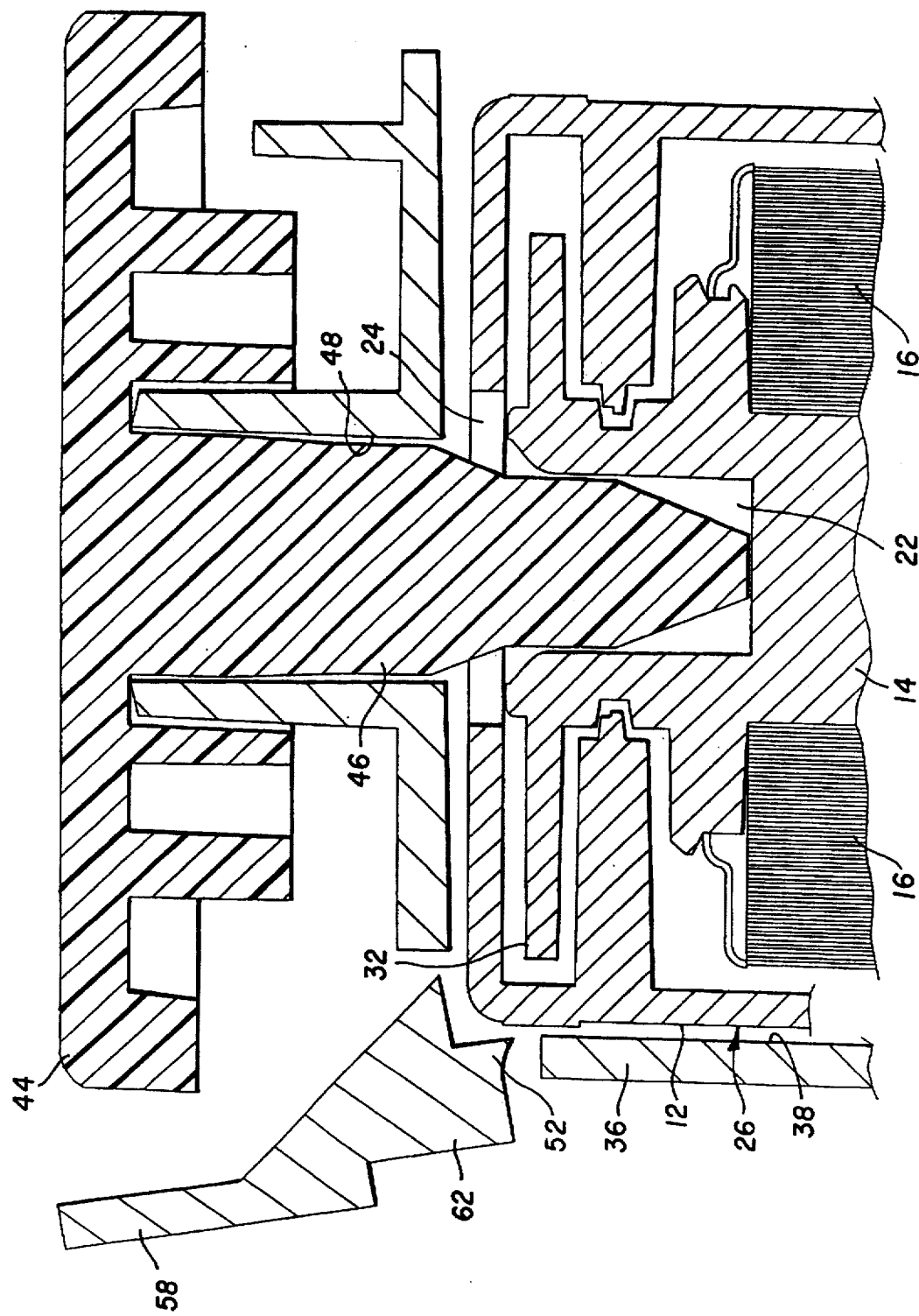
FIG. 7 is an elevation section view of the limited portion shown in FIG. 3, and including the standard film cartridge.

The blocking protuberance 52 has a hollowed-out space 54 that is open at an exterior portion 56 of the main body part 36 as shown in FIGS. 1 and 2. The blocking portion 52 can be cut off the main body part 12 at the hollowed-out space 54, as shown in FIG. 7, in order to provide a clearance space for the standard film cartridge 26 to be located in the predetermined position within the cartridge receiving chamber 38. However, a problem results in that this will allow ambient light to leak through a hole resulting in the cartridge receiving chamber 38.

One can plug, cover or otherwise close the hole to recycle (remanufacture) the main body part 12, but it is preferable in order to maintain quality to replace the spent body part with a fresh suitable body part during recycling of the one-time-use camera 34.

An anti-backup pawl 58 is provided for engaging successive peripheral teeth 60 of the film winder wheel 44 to prevent rotation of the film winder wheel in a reverse direction opposite to the film winding direction 50. See FIGS. 1, 2, 5 and 6. The anti-backup pawl 58 has a base portion 62 integrally formed with the main body part 36 within the hollowed-out space 54 to be disconnected from the main body part in order to be disabled when one cuts the protuberance 52 off the main body part at the hollowed-out space as shown in FIG. 7.

If one plugs, covers or otherwise closes the hole to recycle (remanufacture) the main body part 12 a fresh pawl 58 can be connected to the main body part 12.

The invention has been described with reference to a preferred embodiment. However, it will be appreciated that variations and modifications can be effected by a person of ordinary skill in the art without departing from the scope of the invention. For example, instead of the anti-backup pawl 58 being disabled when one cuts the protuberance 52 off the main body part at the hollowed-out space as shown in FIG. 7, other known functional elements capable of performing a known camera function can be disabled when the protuberance is cut off the main body part at the hollowed-out space.

PARTS LIST 10. modified film cartridge
12. shell
14. film spool
16. filmstrip
18. light lock
20. film slot
22. drive cavity
24. top circular opening
26. standard film cartridge
28. top recess or cut-out
30. data disk supporting flange
32. data disk supporting flange
34. one-time-use camera
36. main body part
38. cartridge receiving chamber
40. unexposed film roll chamber
42. exposure aperture
44. film winder wheel
46. depending coaxial stem
48. top circular opening
50. film winding direction
52. blocking protuberance
54. hollowed-out space
56. exterior portion
58. anti-backup pawl
60. peripheral teeth
62. base portion

What is claimed is:

1. A method of remanufacturing a one-time-use camera including (a) a modified cartridge that has a recess which is not on a standard cartridge and (b) a main body part having a blocking protuberance that projects into a chamber in the main body part to fit in the recess when the modified cartridge is located in a predetermined position within the chamber, but which will abut the standard cartridge to prevent it from being located in the predetermined position within the chamber if one attempts to substitute the standard cartridge for the modified cartridge, and which has a hollowed-out space that will allow ambient light to leak into the chamber should one cut the protuberance off the main body part at the hollowed-out space in order to permit the standard cartridge to be located in the predetermined position within the chamber, said method comprising the steps of:

cutting the protuberance off the main body part at the hollowed-out space in order to permit the standard cartridge to be located in the predetermined position within the chamber;

closing a hole in the chamber, resulting from the protuberance being cut off the main body part at the hollowed-out space, to prevent ambient light from leaking into the chamber through the hole; and locating the standard cartridge in the predetermined position within the chamber.

2. A camera made by the method as recited in claim 1.

3. A method of remanufacturing a one-time-use camera including (a) a modified cartridge that has a recess which is not on a standard cartridge and (b) a main body part having a blocking protuberance that projects into a chamber in the main body part to fit in the recess when the modified cartridge is located in a predetermined position within the chamber, but which will abut the standard cartridge to prevent it from being located in the predetermined position within the chamber if one attempts to substitute the standard cartridge for the modified cartridge, and which has a hollowed-out space that will allow ambient light to leak into the chamber should one cut the protuberance off the main body part at the hollowed-out space in order to permit the standard cartridge to be located in the predetermined position within the chamber, said method comprising the steps of:

closing a hole in the chamber, resulting from the protuberance being cut off the main body part at the hollowed-out space, to prevent ambient light from leaking into the chamber through the hole; and locating the standard cartridge in the predetermined position within the chamber.

4. A camera made by the method as recited in claim 3.

5. A method of remanufacturing a one-time-use camera including (a) a modified cartridge that has a recess which is not on a standard cartridge and (b) a main body part having a blocking protuberance that projects into a chamber in the main body part to fit in the recess when the modified cartridge is located in a predetermined position within the chamber, but which will abut the standard cartridge to prevent it from being located in the predetermined position within the chamber if one attempts to substitute the standard cartridge for the modified cartridge, and which can be cut off the main body part to provide a clearance space for the standard cartridge to be located in the predetermined position within the chamber and has a functional element that performs a particular function for the camera and that is separated from said main body part in order to be disabled should one cut the protuberance off the main body part to provide the clearance space, said method comprising the step of:

cutting the protuberance together with the functional element off the main body part to permit the standard cartridge to be located in the predetermined position within the chamber;

replacing the functional element on the main body part without the protuberance; and locating the standard cartridge in the predetermined position within the chamber.

6. A camera made by the method as recited in claim 5.

7. A method of remanufacturing a main body part for a one-time-use camera including a blocking protuberance that projects into a chamber in the main body part to fit in a recess of a modified cartridge when the modified cartridge is located in a predetermined position within the chamber, but which will abut a standard cartridge without the recess to prevent the standard cartridge from being located in the predetermined position within the chamber if one attempts to substitute the standard cartridge for the modified cartridge, and which has a hollowed-out space that will allow ambient light to leak into the chamber should one cut the protuberance off the main body part at the hollowed-out space in order to permit the standard cartridge to be located in the predetermined position within the chamber, said method comprising the step of:

cutting the protuberance off the main body part at the hollowed-out space in order to permit the standard cartridge to be located in the predetermined position within the chamber.

8. A method as recited in claim 7, comprising the further step of:

covering a hole in the chamber, resulting from the protuberance being cut off the main body part at the hollowed-out space, to prevent ambient light from leaking into the chamber through the hole.

9. A method as recited in claim 8, comprising the further step of:

locating the standard cartridge in the predetermined position within the chamber.

10. A method of remanufacturing a main body part for a one-time-use camera including a blocking protuberance that projects into a chamber in the main body part to fit in a recess of a modified cartridge when the modified cartridge is located in a predetermined position within the chamber, but which will abut the standard cartridge to prevent it from being located in the predetermined position within the chamber if one attempts to substitute the standard cartridge for the modified cartridge, and which can be cut off the main body part to provide a clearance space for the standard cartridge to be located in the predetermined position within the chamber and has a functional element that performs a particular function for the camera and that is separated from the main body part in order to be disabled should one cut the protuberance off the main body part to provide the clearance space, said method comprising the step of:

cutting the protuberance together with the functional element off the main body part to permit the standard cartridge to be located in the predetermined position within the chamber.

11. A method as recited in claim 10, comprising the further step of:

replacing the functional element on the main body part without the protuberance.

12. A method as recited in claim 11, comprising the further step of:

locating the standard cartridge in the predetermined position within the chamber.

* * * * *